Jan. 27, 1970          G. J. HAHN          3,492,264

TITANIUM DIOXIDE STABILIZING

Filed Feb. 8, 1968

INVENTOR
GRANVILLE J. HAHN
BY

Sol B. Wiczer
ATTORNEY

United States Patent Office 3,492,264
Patented Jan. 27, 1970

3,492,264
TITANIUM DIOXIDE STABILIZING
Granville J. Hahn, Big Spring, Tex., assignor to Cosden Oil & Chemical Company, Big Spring, Tex., a corporation of Delaware
Filed Feb. 8, 1966, Ser. No. 525,949
Int. Cl. C08k 1/06; C08f 45/04
U.S. Cl. 260—41    11 Claims

ABSTRACT OF THE DISCLOSURE

Compositions to be pigmented by admixture with titanium dioxide are abrasively mixed with the titanium dioxide in a mixer comprising moving metallic surfaces in the presence of finely-divided alkaline solids including alkali hydroxide, alkali earth metal oxides and hydroxides, as well as alkali and alkali earth metal salts of an alkaline character, as well as alkali metal compounds of per acids supplied in small quantity as a color inhibitor and used in dry particle or powder form to inhibit the discoloring of the titanium during dry mixing in the composition to be pigmented therewith, the alkaline solids forming a dry powdered coating upon the catalytic surfaces tending to inhibit the transfer of color and discoloration of the pigment with the abraded metal of the mixer surface.

---

Figure 1:
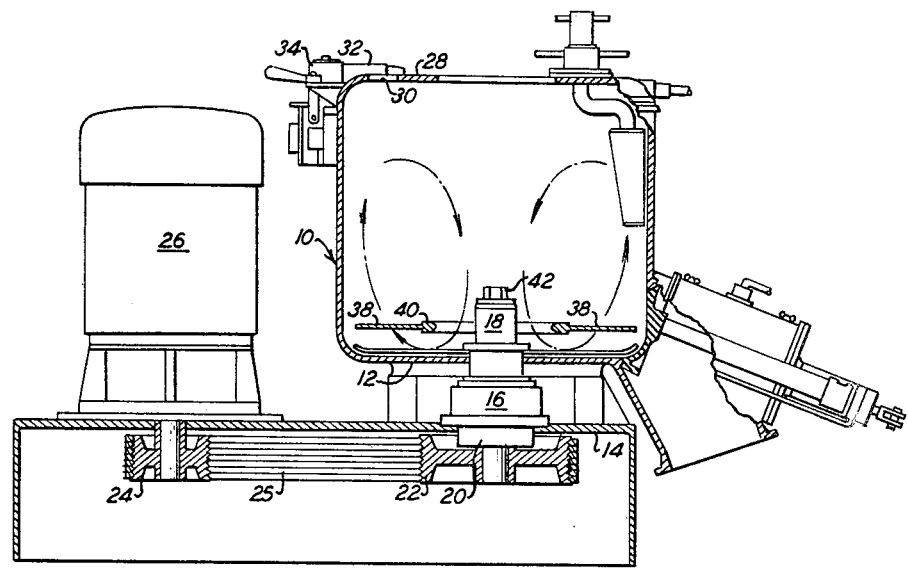

This invention relates to inhibiting discoloration, typically graying, during abrasive mixing of titania with dry plastic particles to be light pigmented therewith in a metallic mixer.

More particularly, this invention is directed to inhibiting graying of titanium dioxide compositions worked as by mixing, blending or milling by abrasive contact with ferrous metal, nickel, stainless steel, or the like metal surfaces.

In applications of light pigment comprising titanium dioxide to dry plastic particles, usually used for molding, the product is mixed abrasively in contact with mixer surfaces under substantial pressure, abrasion and shearing or milling under substantial pressure of rollers, whereby there is substantial abrasive contact between the metal surfaces of the mixing device, usually of iron, and the titanium containing composition, which results in rubbing off some metal and in a substantial graying of the brilliant white titania or carefully selected pastel-modified shades thereof.

The coloring is found to be imparted by the abrasive contact of the mixing or milling device in which the metal component, usually iron or a typical alloy or plating metal thereof, from which mixing blades or bowls are normally formed such as chromium, nickel, zinc and the like. In a typical case, it is found that high speed mixing devices such as a rapidly rotating blade mixer imparts a gray discoloration to the pigment from this abrasive contact.

According to the present invention it is found that the graying of the titanium dioxide containing composition is very substantially reduced and generally inhibited by including in the composition a friable, usually alkaline, dust-forming component which is or becomes during the mixing comminuted to very fine, dust-like particles which coat and adhere upon the mixer metal surfaces, such dust-like particle ranging finer than about 60 mesh and downward in the range of 60 to 200 mesh. While applicant does not intend to be limited to a theory, it is believed that the graying is inhibited by the formation of the fine dust-like particles which adhere as such to the moving metal surface of the mixer. The inhibitor materials which form such dust-like particles comprise alkaline bodies; typically, solid alkalies, alkaline salts and friable solid particulate materials which are formed in alkaline treatment, as to inherently possess an alkaline pH. Such solid inhibitors may, in fact, react with the metallic mixer surfaces to form a protective adherent coating thereon which reduces or prevents the abrasion of the metal from the moving surfaces thereby as a discoloring contaminant of the titania.

Accordingly, a primary object of this invention is to inhibit the graying of titania pigment compositions and products which are light pigmented with titanium dioxide during their working to blend the titania pigment into a homogeneous dispersion throughout the body to be pigmented.

In typical operation, according to the invention, various solid plastics, for instance, crystal bead polystyrene particles, graft polymerized polystyrene with natural or synthetic rubber particles and other particles such as polyvinyl chloride, polyvinyl acetate and mixed polyvinyl chloride acetate, polyvinyl acetal, cellulose esters and ethers, polyesters of phthalic and terephthalic acid with glycols and glycerols, polyacrylonitriles, polyamids and the like; typically, plastic solids used in molding or coating compositions, sometimes modified with each other as blends, and copolymers thereof as known in the art, may be blended for pigmenttation with titanium dioxide. Such plastic particles may be pigmented with titanium dioxide or modified light panel colors containing titaniu mdioxide; that is, a blend of titanium oxide with modifying pigments in which titania is the predominant pigment substance. Such dry molding or coating composition is normally milled or mixed, often under high pressure or at high speed, in mixing a milling devices operating with abrasive contact o fthe working surfaces of the mixer with the composition being worked, and/or blended, in a manner which abrasively imparts graying of the titania.

According to this invention the graying of the titania pigmented product is inhibited by mixing a small quantity, usually less than 1%, and often as low as 0.001% of inhibitor will suffice, to reduce the entirely prevent the graying effect during mixing of the pigment into the particulate solids composition.

Such inhibitor is generally an alkaline material as described above; typically, caustic soda, potassium carbonate, lime, barium oxide, strontium oxide, magnesium oxide, sodium borate, sodium methylate, sodium aluminate and the like. Each of such materials as added to the mixer during blending of titania pigment with solid particles of plastic for forming evenly pigmented molding or coating compositions thereof, are such as may readily be comminuted during the mixing to very fine dust-like particles. They may even be initially added to the mixer in the form of fine dusts of less than 60 mesh and preferably in the range of 200 to 60 mesh, U.S. standard sieve.

It appears, without desiring to be limited to theory, that such alkaline solid materials preferably used herein form a very fine dust-like protective coating upon the mixing blades of the mixer which inhibits or forms an insulating layer separating the abrasive force of the particles being mixed from the surface of the metal, preventing metal abrasion which is the primary cause of the graying effect normally imparted to the titania in the absence of the protective additive. It is not known whether it is the alkaline character which inhibits the abrasion of the metal or whether it is the property of forming the dust-like particles as a protective layer upon the metal. It has only been determined that the graying effect is, in fact, abraded metal; typically, iron, nickel, chromium or the like, metal which was a surface component of the mixer resulting from the working of the pigmented composition during its formation into a homogeneous pigmented blend. The best inhibitors are alkaline solids and all form a very fine dust-like coating upon the blade. For example, fine silica gel in containing substantial alkali as impurity is effective and is classifiable as an alkaline material. When used as the inhibitor, it is in fine particles, less than 60 mesh, and is quite effective to inhibit the graying of the titania.

Figure 2:
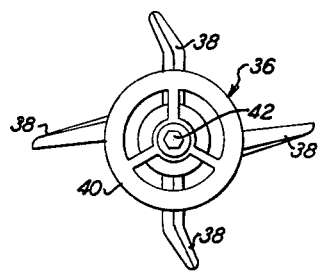

To illustrate the practice of this invention, a commercial Prodex-Henschel mixer which comprises merely a tank anl a stainless steel mixing blade mounted near the bottom to a hub projected upward from the bottom for driving is shown in the attached drawing wherein:

FIG. 1 is a section through the mixer; and
FIG. 2 is a plan view of the mixing blade.

The mixer comprises a tank or bowl 10 having a bottom 12 supported on a base 14 above which projects a driving hub 16 having its inner end 18 projecting through the bottom and its outer end 20 supporting a driving pulley 22 cooperating with the driving pulley 24 of a driving motor 26 which imparts rotary drive to the pulley 22 by way of driving belt 25. The upper end of the tank 10 may be enclosed with a permanent cover 28 having openings 30 covered by removable plates 32 secured by quick-acting locks or latches 34. The mixing impeller 36 shown in FIG. 2 consists of four blades 38 supported from an impeller ring 40 fastened by a nut 42 to the inner end of the hub 18. The Prodex-Henschel mixer, here described, is operated at variable speeds from 400 to 3850 rvolutions per minute and has a tip speed of 100 to 500 inches per second controllably ranging upward to 1500 inches per second. At very low speeds very little grayness is imparted to the mix. Moreover, mixing applied for a very short time, such as less than 30 seconds, likewise showed little graying. It is the high speed, long-time mixing required for this type of pigment, sensitive to color contamination, which presents the primary problem.

To illustrate the invention, the following example is presented:

EXAMPLE

A series of runs were made in which five pounds of water-while polystyrene beads averaging about 60 mesh in size were mixed with a pigmenting quantity such as about 2% titanium dioxide in the high intensity mixer described. For these test purposes the mixer was operated at 3800 r.p.m., producing a tip speed of 700 inches per second for an arbitrary period of three minutes. The degree of grayness was measured by an arbitrary scale ranging from 0 to 10, the 0 value being for the whitest, the 5 value being a control mixing applied in a normal three minute run with no color inhibitor chemical added, and the value of 10 being the extreme gray color imparted by operating the control for seventeen minutes without color inhibitor. The temperature was controlled during the mixing so that the composition in the mixer never exceeded 110° F. The gray discoloration in numerous tests was analyzed by washing the mixture with 6 N HCl to extract the gray and the extract was analyzed to contain small amounts of nickel, although it was mostly iron, usually the free metallic form, although some of the metal was possibly present in the oxide form.

The folowing table illustrates the results of testing through a wide range of materials, pointing out and listing the results in degrees of graying by the scale as set forth above and the type of coating appearing on the coating blade since, as stated, there was almost always some coating on the blade whenever the inhibitor had some beneficial effect to reduce the graying.

TABLE 1

| Run No. | Time (min.) | R.p.m. | TiO₂ crystalline in grams | Chemical | Amount of color inhibitor (grams) | Degree of gray |
|---|---|---|---|---|---|---|
| 71 | 3 | 3,800 | 45.5 | Lime | 2.0 | 2 |
| 74 | 3 | 3,800 | 45.5 | ___do___ | 1.5 | 2 |
| 75 | 3 | 3,800 | 45.5 | NaOH | 1.5 | 0 |
| 76 | 3 | 3,800 | 45.5 | K persulfate | 1.5 | 0 |
| 91 | 3 | 3,800 | 45.4 | Lime | 4.0 | 1 |
| 92 | 1 | 3,800 | 45.4 | ___do___ | 4.0 | 2 |
| 101 | 3 | 3,800 | 35.4 | 20% NaOH Sol | ²10 | 1 |
| 102 | 3 | 3,800 | 45.4 | NaOH | 4.0 | 0 |
| 117 | 3 | 3,800 | 45.4 | Potassium persulfate. | 2.0 | 2 |
| 118 | 3 | 3,800 | 45.4 | Lime | 4.0 | 1 |
| 125 | 3 | 3,800 | 45.4 | CaCl₂ fine particle size. | 2.0 | 0 |
| 126 | 3 | 3,800 | 45.4 | NaHCO₃ | 2.0 | 1 |
| 157 | 3 | 3,800 | 45.4 | Lime | 2.0 | 0 |
| 168 | 3 | 3,800 | 11.5 | ___do___ | 2.0 | 3 |
| 173 | 3 | 3,800 | 45.4 | NaOH | 2.0 | 0 |
| 176 | 3 | 3,800 | 11.5 | HaOH | 2.0 | 0 |
| 177 | 3 | 3,800 | 45.4 | Lime | 2.0 | 1 |
| 184 | ¹30 | 3,800 | 45.4 | NaOH | 2.0 | 0 |
| 191 | 3 | 3,800 | 45.4 | Sodium borate | 2.0 | 0 |
| 192 | 3 | 3,800 | 45.4 | NaOCH₃ | 2.0 | 0 |
| 199 | 3 | 3,800 | 45.4 | Lime | 2.0 | 0 |

¹ Seconds.
² Cc.

It will be noted that substantially all of the discoloration inhibitors having a benefit to reduce the graying substances below that of the control are alkaline either initially having or producing during the mixing a fine particle size, and a substantial fine particle coating is built up upon the mixing blade.

It was desired further by test to relate the quantity of iron in the grayed mixed sample to the degree of graying, and the following table demonstrates the large quantity of iron that is present in the grayed control mix in contrast to the reduced graying when effective color inhibitors are present during the mixing. It was desired further to illustrate the reliable property of certain materials to reduce the graying and, consequently, the iron and nickel content of the mix.

TABLE 2

[Iron content of samples run with 2% TiO₂ for three minutes at 3800 r.p.m.]

| Chemical Added | Weight of chemical added (grams) | Degree of grayness | Ferric iron, p.p.m. | Total iron, p.p.m. |
|---|---|---|---|---|
| NaOH | 2.0 | 0 | 0.9 | 1.3 |
| Lime | 2.0 | 2 | 1.4 | 2.2 |
| NaOH | 4.0 | 0 | 0.5 | 0.8 |

It was also found, as stated, that the degree of graying in terms of quantity of iron contained in the grayed mixture varies within the time of mixing, further confirming that it is an abrasive effect upon the mixer blades as shown in the following table:

TABLE 3

[Iron content as a function of mixing time. Sample contains 2% TiO₂]

| Time mixed | Degree of grayness | Ferric iron, p.p.m. | Total iron, p.p.m. |
|---|---|---|---|
| 30 sec | 1 | 2.4 | 2.7 |
| 3 min | 8 | 2.6 | 6.3 |
| 6 min | 7 | 4.2 | 7.7 |
| 10 min | 8 | 5.0 | 14.5 |
| 17 min | 10 | 7.6 | 52.3 |

It will be noted, again, as shown in the following table, that the inhibitor functions to reduce the amount of iron abraded from the mixing blade. For this purpose a typical graying inhibitor, sodium hydroxide, was used. Despite large variation in mixing time, beyond the initial 30 seconds, the actual iron content is either low or reduced.

TABLE 4

[Iron content of sample treated with NAOH as a function of mixing time. Used 2.0 grams NaOH and 2% $TiO_2$]

| Time mixed | Degree of grayness | Ferric iron, p.p.m. | Total iron, p.p.m. |
| --- | --- | --- | --- |
| 30 sec | 0 | 0.5 | 0.5 |
| 3 min | 0 | 1.5 | 2.1 |
| 6 min | 0 | 0.8 | 1.2 |
| 10 min | 0 | 0.9 | 0.9 |
| 17 min | 0 | 0.9 | 1.0 |

As thus described, the graying effect of titania pigment imparted during its intensive mixing or working for blending of the titania with carriers to be pigmented therewith, is found to be inhibited by adding to the product to be mixed a small quantity of a solid alkaline material in fine particle size less than about 60 mesh or which is of a character which is largely reduced in the mixing to particles of less than 60 mesh. Such pigmented mixing is usually applied to the mixing of titania with carrier and molding compositions, thus to be pigmented or typical coating or both compositions pigmented with titanium dioxide.

It will be noted that many of the alkaline salts are of the peroxy type and, in addition to forming a dust-like layer, may have a direct oxidizing effect upon the metal blade to form a protective oxide coating thereon. Indeed, it is found that certain direct oxidizing compounds such as hydrogen peroxide seem to have a stabilizing effect which apparently forms a protective oxide coating to inhibit graying.

The product inhibits the graying which results apparently by abrasion of metal, largely iron, from the mixing surfaces to which the intensely white titania is sensitive. The treatment may be imparted to titania pigmented compositions even where the color has been slightly modified to other pastel colors sensitive to graying and largely colored by a substantial content of titanium dioxide in a mixture of pigments.

The method is applicable despite substantial variation in the type of mixer and the intensity or abrasive effect imparted thereby. Thus, it would be useful where the mixing velocity is high or relatively low, to use slow moving mixing devices where substantial pressures are applied or the mixing is imparted over a long period of time and produces substantial abrasion.

Accordingly, it is intended that the description be regarded as illustrative and not limiting except as defined in the claims appended hereto.

I claim:

1. The method of inhibiting the graying of titanium dioxide pigmented composition comprising dry plastic particles to be pigmented therewith imparted during the abrasive mixing of said composition in a metallic surfaced mixer, comprising mixing the dry titanium dioxide with said plastic particles to be pigmented therewith in the presence of a small graying inhibitive quantity of dry solids selected from the group consisting of oxides, hydroxides, bicarbonates and carbonates of the alkali metals and oxides and carbonates of the alkaline earth metals.

2. The method of inhibiting the graying of titanium dioxide pigmented composition comprising dry titanium dioxide and dry plastic particles to be pigmented therewith imparted during the abrasive mixing of said dry composition in a metallic surface mixer, comprising mixing the dry titanium dioxide with said plastic particles to be pigmented therewith in the presence of a small graying inhibitive quantity of dry alkaline solids selected from the group consisting of calcium oxide, barium oxide, strontium oxide, magnesium oxide, calcium hydroxide, sodium hydroxide, potassium persulfate, sodium bicarbonate, sodium aluminate, potassium carbonate, calcium chloride, sodium methylate and sodium borate in said mixer.

3. The method of claim 1 wherein the graying inhibitor is sodium hydroxide.

4. The method of claim 1 wherein the graying inhibitor is calcium oxide.

5. The method of claim 2 wherein the pigmented composition is a dry mix of titanium dioxide and polystyrene beads.

6. A homogeneous abrasively blended composition comprising titanium dioxide as a light pigment homogeneously mixed with particles of a polymeric carrier body pigmented therewith and a minor quantity of a graying inhibitor of the group consisting of calcium oxide, barium oxide, strontium oxide, magnesium oxide, calcium hydroxide, sodium hydroxide, potassium persulfate, sodium bicarbonate, sodium aluminate, potassium carbonate, calcium chloride, sodium methylate and sodium borate.

7. The composition of claim 6 wherein the polymeric carrier body comprises polystyrene particles.

8. The composition of claim 6 wherein the graying inhibitor is sodium hydroxide.

9. The composition of claim 6 wherein the graying inhibitor is lime.

10. A homogeneous abrasively blended composition comprising titanium dioxide as a light pigment homogeneously mixed with particles of a polymeric carrier body pigmented therewith and a minor quantity of a graying inhibitor of the group consisting of hydrogen peroxide, alkali and alkali earth metal peroxy salts.

11. The method of inhibiting the graying of titanium dioxide pigmented compositions imparted during the dry abrasive mixing of said composition in a metallic surfaced mixer, comprising mixing the dry titanium dioxide with the dry composition to be pigmented therewith in the presence of a small quantity, insufficient to wet said composition, of a graying inhibitive oxidizing agent selected from the group consisting of hydrogen peroxide, alkali and alkali earth metal peroxy salts.

References Cited

UNITED STATES PATENTS

| | | | |
| --- | --- | --- | --- |
| 2,591,988 | 4/1952 | Wilcox | 106—300 |
| 3,019,123 | 1/1962 | Biller | 106—308 |
| 3,041,303 | 6/1962 | Nelson | 260—41 |
| 3,197,425 | 7/1965 | Konig | 106—308 |
| 3,224,997 | 12/1965 | Hunter | 260—41 |
| 3,313,492 | 4/1967 | Jacobs et al. | 106—288 |
| 3,331,560 | 7/1967 | Hodgson et al. | 241—16 |

JAMES E. POER, Primary Examiner

H. M. S. SNEED, Assistant Examiner

U.S. Cl. X.R.

106—300, 308, 309; 241—16, 22; 260—214; 264—109